United States Patent [19]
De Haan et al.

[11] Patent Number: 6,122,016
[45] Date of Patent: Sep. 19, 2000

[54] VIDEO SIGNAL PROCESSING

[75] Inventors: Gerard De Haan; Tatiana G. Kwaaitaal-Spassova, both of Eindhoven, Netherlands

[73] Assignee: U.S. Philips Corporation, New York, N.Y.

[21] Appl. No.: 08/556,694

[22] Filed: Nov. 13, 1995

[30] Foreign Application Priority Data

Nov. 14, 1994 [EP] European Pat. Off. ............ 94203305
Aug. 11, 1995 [WO] WIPO ..................... PCT/IB95/00633
Oct. 6, 1995 [WO] WIPO ..................... PCT/IB95/00851

[51] Int. Cl.$^7$ ........................... H04N 5/21; H04N 5/213; H04N 5/217
[52] U.S. Cl. ........................................ 348/620; 348/623
[58] Field of Search .................... 348/618, 619, 348/620, 623, 607–617; 382/261, 264, 265; 364/724.19; H04N 5/21, 5/213, 5/217

[56] References Cited

U.S. PATENT DOCUMENTS

| | | | |
|---|---|---|---|
| 4,057,828 | 11/1977 | Monahan | 358/32 |
| 4,816,899 | 3/1989 | Strolle et al. | 348/607 |
| 4,907,087 | 3/1990 | Schreider | 358/186 |
| 4,980,767 | 12/1990 | Chao et al. | 358/187 |
| 5,005,082 | 4/1991 | Zdepski et al. | 348/613 |
| 5,323,238 | 6/1994 | Yoshimura et al. | 348/607 |
| 5,355,178 | 10/1994 | Parulski | 348/620 |
| 5,493,343 | 2/1996 | Knutson et al. | 348/607 |
| 5,497,187 | 3/1996 | Banker et al. | 348/478 |
| 5,519,454 | 5/1996 | Willis | 348/663 |
| 5,574,512 | 11/1996 | Saeger | 348/620 |
| 5,715,335 | 2/1998 | De Haan et al. | 348/627 |

FOREIGN PATENT DOCUMENTS

0581059A2  2/1994  European Pat. Off. ......... H04N 5/21

*Primary Examiner*—Howard Britton
*Assistant Examiner*—Nhon T. Diep
*Attorney, Agent, or Firm*—Edward W. Goodman

[57] ABSTRACT

In a method of processing a video signal, including the step furnishing (11) a filtered signal in response to the video signal, the filtering is adapted (22) in dependence upon a statistical property (AC) of a modification effected by the filtering in a previous time interval of the video signal. Preferably, the filtering is adapted (22) in dependence upon an average modification (AC) effected by the filtering in a previous field or frame of the video signal.

6 Claims, 5 Drawing Sheets

VIDEO SIGNAL PROCESSING

BACKGROUND OF THE INVENTION

1. Field of the Invention

The invention relates to a method and apparatus for processing a video signal, for example, for reducing an amount of noise in the video signal. The invention also relates to a television signal receiver comprising such an apparatus.

2. Description of the Related Art

European Patent Application EP-A-0,581,059 discloses a method of recursive noise reduction in television or video signals by means of a circuit arrangement comprising a noise reduction circuit, whose first input signal is the television or video signal, and whose second input signal is the low-frequency part of the output signal of the noise reduction circuit delayed over a field period by means of a field delay circuit. A decimating filter is arranged between the output of the noise reduction circuit and the input of the field delay circuit for reducing the data rate, which allows that a field delay circuit with a smaller storage capacity is used. The decimating filter comprises a low-pass filter for reducing the bandwidth by a factor 2, a quantizer for reducing the amplitude resolution from 8 bits to 7 bits, and a circuit for reducing the data rate by a factor 2. An interpolating filter is arranged between the output of the field delay circuit and the second input of the noise reduction circuit for increasing the data rate.

Experimentally it was found that still artifacts can be introduced in clean pictures.

SUMMARY OF THE INVENTION

It is, inter alia, an object of the invention to provide a video signal processing method and apparatus in which these artifacts are reduced. To this end, a first aspect of the invention provides a method of processing a video signal. A second aspect of the invention provides a clamp noise reduction filter for image data signals, comprising means for calculating averages of groups of pixels for every line of pixels to obtain a zero frequency component, memory means for storing one or more of these average values for every line of pixels, filtering means for filtering these average values, and means for modifying a DC level of all pixels in a line with a value related to a difference between an average value of a group of pixels taken from that line and the output of the filtering means, in which the filtering means are adapted in response to a statistical property of a modification of the DC-level effected by the filtering in a previous time interval of the image data signal. A third aspect of the invention provides a television signal receiver comprising an input for receiving a video signal, means for processing said video signal to furnish a processed video signal, and a display for displaying the processed video signal, the processing means comprising means for furnishing a filtered signal in response to the video signal, wherein the filtering is adapted in dependence upon a statistical property of a modification effected by the filtering in a previous time interval of the video signal.

In accordance with a primary aspect, the invention provides a video signal processing method comprising the step of furnishing a filtered signal in response to the video signal, wherein the filtering is adapted in dependence upon a statistical property of a modification effected by the filtering in a previous time interval of the video signal.

Thus, in accordance with the invention, the problem is solved by adapting the filters to the amount of distortion in the image sequence. To this end, a statistical property of the correction effected by the filtering in a previous time interval is determined. Preferably, an average correction for each field is calculated. It is expected that in sequences with heavy distortion, the effect of the filter is stronger than in sequences with little distortion. With an ideally working filter and a uniform distribution of the distortion, it can even be expected that the average correction is close to half the peak level of the distortion. When the invention is applied to a recursive filter, the measured average correction can therefore be used to adapt the filter so that in case of differences larger than the expected peak level of the distortion, the mixing ratio k of the recursive filters reaches unity. Consequence: with little distortion weaker filtering and stronger filtering in case of strong distortion. To achieve the adaptation, the calculated average correction in the current field may be used to define an interval, which is used in the next field to limit the effect of filtering. Instead of the average, another statistical property, e.g., the median, of the modification effected by the filtering can be used. Instead of a field period, another time interval, like a frame or line period, may be used.

These and other aspects of the invention will be apparent from and elucidated with reference to the embodiments described hereinafter.

DESCRIPTION OF THE PREFERRED EMBODIMENTS

Figure 1:
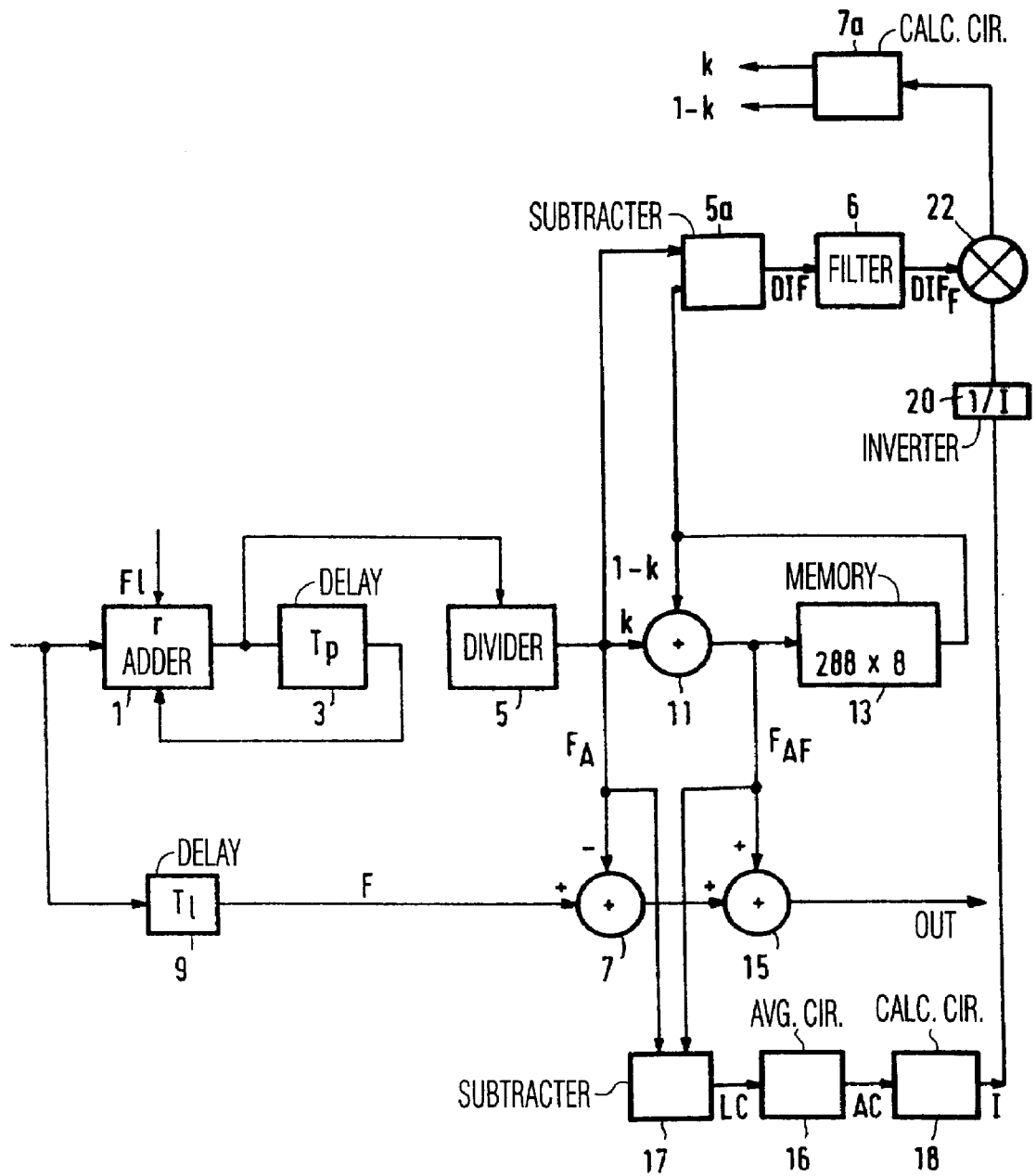
FIG. 1 shows a block diagram of a first application of the invention in a simple embodiment of a clamp noise reduction filter.

A first implementation of the invention concerns clamp noise reduction for video signals. As is known, clamp noise reduction of image data can be realized by using recursive temporal filters. In this case, for every pixel position $\underline{x}=(x, y)^T$, with $^T$ indicating transposition, and an input luminance value $F(\underline{x}, t)$, the filter output $F_F(\underline{x}, t)$ is defined as:

$$F_F(\underline{x},\ t)=k*F(\underline{x},\ t)+(1-k)*F_F(\underline{x},\ t-T) \tag{1}$$

where k is a control parameter defining the filter characteristics, and T is the field period of the video signal, which equals 20 ms in a 50 Hz environment.

As can be seen from equation 1, for each pixel in the field, the filtered luminance value from the previous field has to be stored in a field memory. However, field memories are expensive. Therefore, in the present implementation of the invention, instead of temporal filtering of individual pixels on a line, temporal filtering of the average value of all (or at least a large portion of the) pixels in that line is proposed. The block diagram of the basic idea is given in FIG. 1.

The average luminance value $F_A(y, t)$ for a line at vertical position y with N pixels, is defined as:

$$F_A(y, t) = 1/N * \sum_{x=1}^{N} F(\underline{x}, t) \qquad (2)$$

The filtered average luminance value $F_{AF}(y, t)$ is:

$$F_{AF}(y, t) = k*F_A(y, t) + (1-k)*F_{AF}(y, t-T) \qquad (3)$$

The required memory is reduced to about ⅓ of a line memory or 1/720 of a field memory.

The filter output $F_F(\underline{x}, t)$ for a pixel at position $\underline{x}$ with an input luminance value $F(\underline{x}, t)$ in this case is given by:

$$F_F(\underline{x}, t) = F(\underline{x}, t) - F_A(y, t) + F_{AF}(y, t) \qquad (4)$$

Without interlace and stationary (=non-moving) pictures, the DC-level of a line should be equal to that of the corresponding line in the previous picture. Strong (recursive) filtering of the average value of the pixels (=DC-level) therefore effectively eliminates clamping errors.

With interlace, in principle, a frame delay (of one value per line) is required, but much more important is that motion, and, particularly, vertical motion, can drastically change the average pixel value of a line. A change detector (analogous to a motion detector in temporal filtering on pixel basis) can be applied to adapt the filter. The value of the filter coefficient k is basically a monotonously decreasing function of the absolute difference DIF(y, t) defined as:

$$DIF(y, t) = |F_A(y, t) - F_{AF}(y, t-T)| \qquad (5)$$

In this manner, an edge preserving recursive filter is obtained.

A very reliable filter coefficient k is obtained when recursive vertical filtering is applied to the absolute difference DIF(y, t):

$$DIF_F(y, t) = k*DIF(y, t) + (1-k)*DIF_F((y-1), t) \qquad (6)$$

The filter coefficient k is then calculated as follows:

$$k = 1 - (7/(8 + DIF_F(y, t))) \qquad (7)$$

We found that in the current clamp noise reduction circuit, an alternative, and even more effective, solution of the problem is possible when each line is divided into segments. The background of this segmentation is that it is likely that at least in one of the segments, no DC-change due to motion has occurred.

For each segment $S_i(y)$, consisting of $N_s$ pixels from the line at position y, an average luminance value $F_A(S_i(y), t)$ is defined as:

$$F_A(S_i(y), t) = 1/N_S * \sum_{\underline{x} \in S_i(y)} F(\underline{x}, t) \qquad (8)$$

where $i \in [1, \ldots, n]$ and n is the number of segments, so $N = n*N_s$. Furthermore, for each segment independently, the average luminance value $F_A(S_i(y), t)$ is filtered and $F_{AF}(S_i(y), t)$ is obtained using the information from the corresponding segment from the previous field:

$$F_{AF}(S_i(y), t) = k*F_A(S_i(y), t) + (1-k)*F_{AF}(S_i(y), t-T) \qquad (9)$$

The next problem to be solved is how to find the segment in which no DC-change due to motion has occurred. We propose here to use a differential order statistic filter (DOSF). The assumption is that the least extreme segment is not affected by motion.

The difference $DIF_i(y, t)$ for each segment $S_i(y)$ is found:

$$DIF_i(y, t) = F_A(S_i(y), t) - F_{AF}(S_i(y), t-T) \qquad (10)$$

Let $\underline{Dif} = (Dif_1, Dif_2, \ldots, Dif_n)^T$ be a column vector, comprised of the ordered differences, i.e., it holds:

$$\forall i \in [1, \ldots, n-1]: Dif_i \leq Dif_{i+1} \qquad (11)$$

Then, the output of the DOSF can be the average value of the least extreme segment. This segment will be called the reference segment, denoted by $S_r$ and defined as:

$$S_r = \underline{Dif} \cdot \underline{C} \qquad (12)$$

where $\underline{C}$ is a row matrix of coefficients $C_i$ for which holds:

$$C_i = \begin{cases} 1, & i = (1+n)/2 \\ 0, & \text{else} \end{cases} \qquad (13)$$

It was shown to be beneficial to use the average value of more than one segment, i.e.:

$$C_i = \begin{cases} 1/2, & i = (1+n)/2 \\ 1/4, & i = ((1+n)/2) \pm 1 \\ 0, & \text{else} \end{cases} \qquad (14)$$

The average value of the reference segment is used for the correction of the input signal, and the filter output $F_F(\underline{x}, t)$ for a pixel at position $\underline{x}$ with an input luminance value $F(\underline{x}, t)$ is given by:

$$F_F(\underline{x}, t) = F(\underline{x}, t) - F_A(S_r(y), t) + F_{AF}(S_r(y), t) \qquad (15)$$

In practice, clipping at black and top-white is required to prevent under and overflows. In an alternative embodiment, the rank number can be modified depending on the magnitude of the differences in individual filters.

In a preferred embodiment, each line of a field is divided into seven segments. The memory necessary for storing the filtered average luminance value $F_{AF}(S_i(y), t-T)$ of each segment and every line in this case equals 288*7, which approximately equals the capacity of three line memories. Further, three segments are used in the DOSF and the coefficients $C_i$ are calculated as in equation 14. The output $F_F(\underline{x}, t)$ of the implemented filter for a pixel at position $\underline{x}$ with an input luminance value $F(\underline{x}, t)$ is given by equation 15.

Experimentally, it was found that still artifacts can be introduced in clean pictures. This problem was solved by adapting the filters to the amount of clamp noise in the image sequence. To this end, an average correction AC(t) for each field is calculated according to:

$$AC(t) = 1/288 * \sum_y LC(y, t) \qquad (16)$$

where LC(y, t) is the line correction for the line at position y and is calculated as:

$$LC(y, t) = |F_{AF}(y, t) - F_A(y, t)| \qquad (17)$$

It is expected that in sequences with heavy clamp noise, the effect of the filter on the DC-level is stronger than in sequences with little clamp noise. With an ideal working filter and a uniform distribution of the clamp noise, it can even be expected that the average correction is close to half the peak level of the clamp noise. Therefore, the measured average correction can be used to adapt the filter so that, in case of differences larger than the expected peak level of the clamp noise, the k of the recursive filters reaches unity. Consequence: with little noise weaker filtering and stronger filtering in case of strong noise.

To achieve the adaptation, the calculated average correction in the current field is used to define an interval, which is used in the next field to limit the effect of filtering. In an experimental implementation, the interval is defined as:

$$I(t)=2*AC^2(t-T)+7 \quad (18)$$

The filtered average luminance value $F_{AF}(S_i(y), t)$ (see equation 10) for a given segment $S_i$ with an average luminance value $F_A(S_i(y), t)$ is modified according to:

$$F_{AF}(S_i(y),t)=F_A(S_i(y),t)+\lim[F_{AF}(S_i(y),t)-F_A(S_i(y),t);I(t)] \quad (19)$$

with:

$$\lim[a; b] = \begin{cases} a, & (|a| \leq b) \\ b, & (a > b) \\ -b, & (-a > b) \end{cases} \quad (20)$$

In FIG. 1, an input video signal is applied to a first input of an adder 1 which is reset (input r) by a line frequency signal F1. An output of the adder 1 is applied to a second input of the adder 1, after delay over a pixel delay period Tp by a pixel delay circuit 3, so that the adder 1 determines the sum of all pixel values of a line. A divider 5 divides this sum by the number N of pixels on the line to obtain the average $F_A$ of the pixel values on the line, see equation 2. A subtracter 7 determines a difference between an output signal of the divider 5 and the input video signal delayed over a line delay period T1 by a line delay circuit 9 which provides the signal F mentioned in the above formulae. The output signal of the divider 5 is applied to a first input of a mixer 11 whose output is coupled to its second input thru a field delay circuit 13 having a storage capacity sufficient to hold 288 8-bit samples, i.e., one sample for each of the 288 active video lines of a field (of course, with NTSC signals, another number of active video lines applies). The mixer 11 multiplies the output signal of the divider 5 by k, and the output signal of the field delay circuit 13 by 1-k, before these two are added together, see equation 3. An adder 15 adds the output signal $F_{AF}$ of the mixer 11 to the output signal of the subtracter 7 to obtain an video output signal in accordance with equation 4. The filter thus formed is a temporal first-order recursive filter. With a smaller storage capacity of the memory 13, for example, a storage capacity sufficient to hold 10 8-bit samples, the filter becomes a vertical first-order recursive filter. It goes without saying that mixed implementations are possible as well.

In the present embodiment of the invention, the mixer multiplication control signals k and 1-k are obtained as follows. The average $F_A$ and the filtered average $F_{AF}$ are applied to a subtracting block 17 which operates in accordance with equation 17 to obtain the line correction signal LC. The line correction signal LC is applied to an averaging block 16 which operates in accordance with equation 16 to obtain the average correction signal AC. The average correction signal AC is applied to a calculating block 18 which operates in accordance with equation 18 to obtain the allowed correction interval I. An inverter 20 obtains the signal 1/I. The delayed filtered average $F_{AF}(y, t-T)$ and the average $F_A$ are applied to a subtracting block 5a which operates in accordance with equation 5 to obtain the difference signal DIF. The difference signal DIF is applied to a filtering block 6 which operates in accordance with equation 6 to obtain the filtered difference signal $DIF_F$. The inverted interval 1/I and the filtered difference signal $DIF_F$ are multiplied by a multiplier 22 to obtain an adapted filtered difference signal $DIF_F'$, whose output is applied to a calculating block 7a which largely operates in accordance with equation 7 but on the basis of the adapted filtered difference signal $DIF_F'$. The calculating block 7a provides the mixer multiplication control signals k and 1-k such that the amount of clamp noise in the picture is taken into account.

Figure 2:
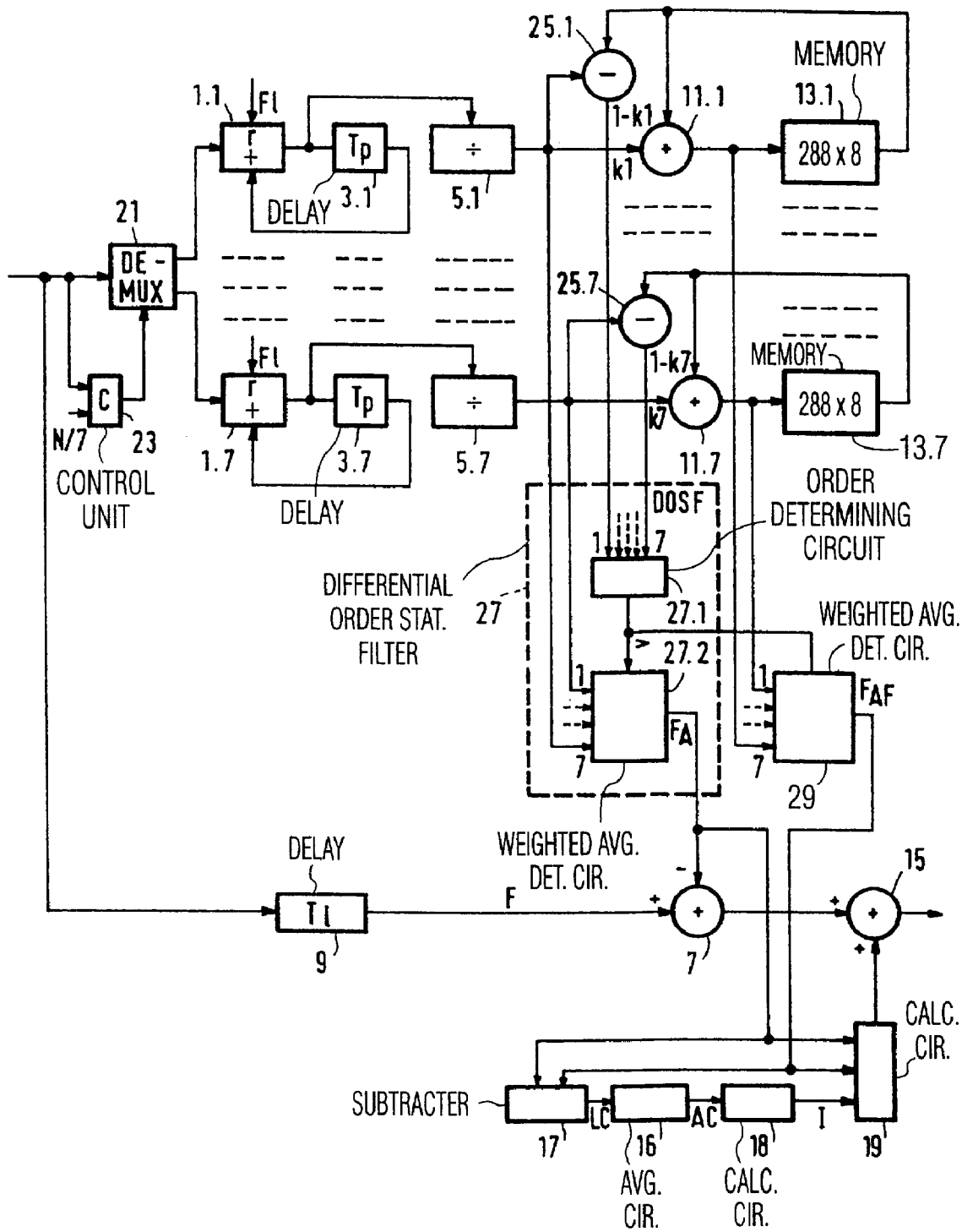
FIG. 2 shows a detailed block diagram of a second application of the invention in a preferred embodiment of a clamp noise reduction filter.

FIG. 2 shows a block diagram of an application of the present invention to a more elaborated clamp noise reduction filter. Only the differences with respect to FIG. 1 will be discussed. The input video signal is applied to a demultiplexer 21 which is controlled by a control unit 23 receiving the input video signal and a number N/7, where N is the number of pixels on a line. The demultiplexer 21 has 7 outputs which are each coupled to a cascade connection of units 1.1, 3.1, 5.1, 11.1, 13.1 thru 1.7, 3.7, 5.7, 11.7, 13.7 as in FIG. 1. Each of these cascade connections is active for a respective segment of a video line, so that each adder 1.i only sums the pixel values of the corresponding line segment and each divider 5.i divides the thus obtained sum by the number N_i of pixels in the corresponding line segment, see equation 9. The thus obtained respective segment averages and the outputs of the respective memories 13.i are applied to respective difference determining circuits 25.i (see equation 10) whose outputs are applied to an order determining circuit 27.1 of a differential order statistic filter (DOSF) 27. The segment averages from the dividers 5.i are applied to respective inputs of a weighted average determining circuit 27.2 in the DOSF 27. The weighted average determining circuit 27.2 is controlled by the order determining circuit 27.1 for determining weighting coefficients in accordance with equation 14, to obtain the reference segment average signal $F_A$ of equation 15, which is applied to the inverting input of the subtracter 7. A second weighted average determining circuit 29, also controlled by the order determining circuit 27.1, receives the output signals of the respective mixers 11.i to obtain the filtered reference segment signal $F_{AF}$ of equation 16. It thus appears that in the embodiment of FIG. 2, each line is divided into 7 segments of equal length. Of course, other numbers of segments are possible as well, and the segments may have unequal lengths. The segments may overlap. It is not necessary that the totality of the segments occupies the whole video line: there may be gaps between the segments.

In the present embodiment of the invention, the mixer multiplication control signals k and 1-k are not modified in dependence upon the allowed correction interval I(t), i.e., the elements 20 and 22 of FIG. 1 are left out and, although not shown, the mixer multiplication control signals k and 1-k are obtained by the cascade connection of the blocks 5a, 6 and 7a of FIG. 1. In contrast with FIG. 1, the filtered average signal $F_{AF}$ is modified as follows before being added by the adder 15 to the output signal of the subtracter 7 to obtain the video output signal. The average $F_A$ and the filtered average $F_{AF}$ are applied to a subtracting block 17 which operates in accordance with equation 17 to obtain the line correction signal LC. The line correction signal LC is applied to an averaging block 16 which operates in accordance with equation 16 to obtain the average correction signal AC. The average correction signal AC is applied to a calculating block 18 which operates in accordance with equation 18 to obtain the allowed correction interval I. The allowed interval I, the average $F_A$, and the filtered average $F_{AF}$ are applied to a calculating block 19 which operates in accordance with equation 19 to obtain an adapted filtered average $F_{AF}$ which is applied to the adder 15.

Figure 3:
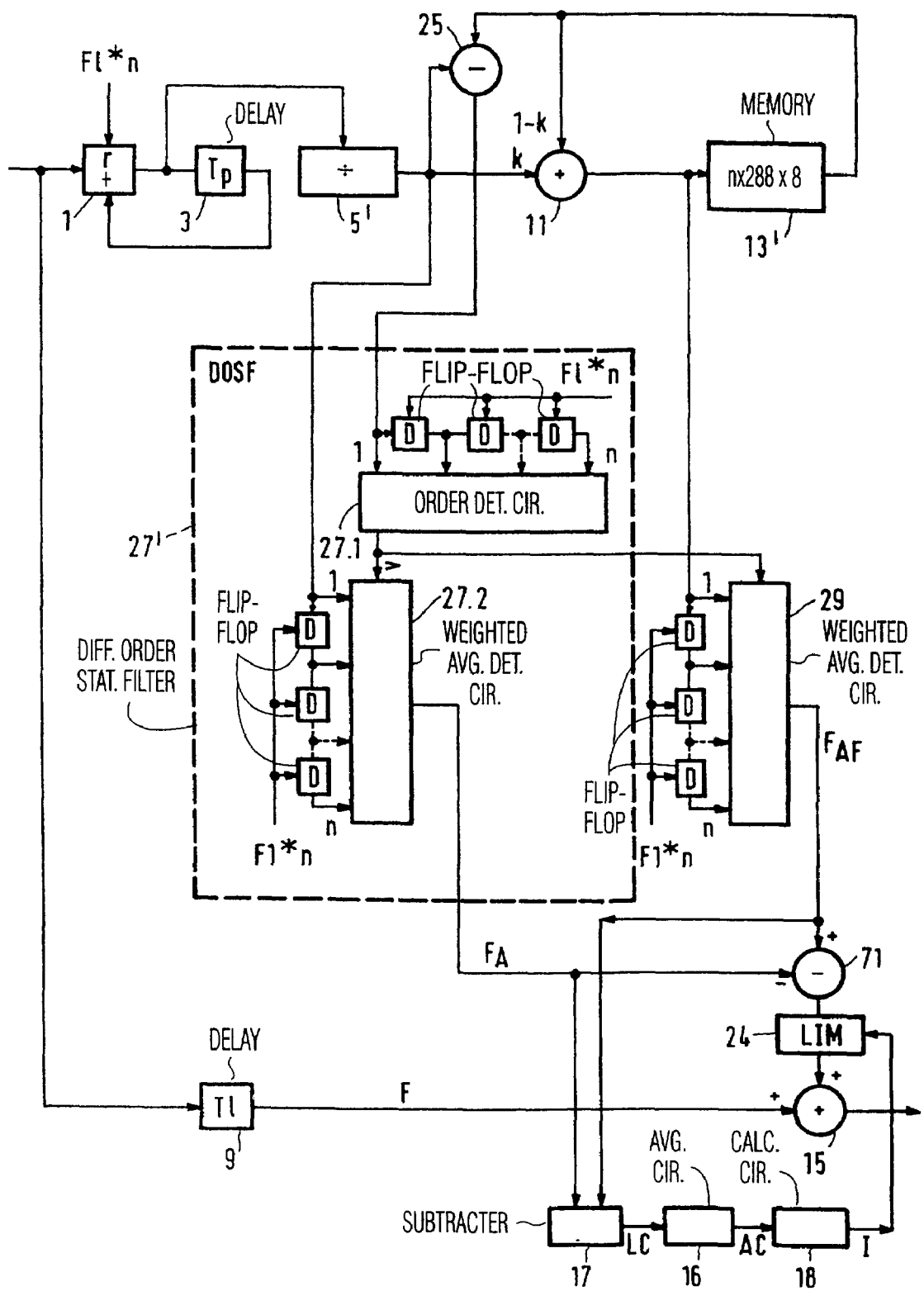
FIG. 3 presents a third application of the invention in an efficient n-segment implementation of a clamp noise reduction filter.

FIG. 3 shows a first application of the present invention to a more efficient implementation of the clamp noise reduction circuit which is generally applicable for any n-segments embodiment. Only the differences with respect to FIG. 1 will be discussed. The adder 1 is reset (input r) n times per line by a signal F1*n, assuming that there are n segments in each line. A divider 5' divides the thus obtained sum by the number N__i of pixels in the corresponding line segment, to obtain the segment average. A memory 13' has a capacity sufficiently large to store 8-bit segment averages for each of the n segments for each of the 288 active video lines of a field. The segment averages and the outputs of the memory 13' are applied to a difference determining circuit 25 whose output is applied to a first input of an n-input order determining circuit 27.1 of a differential order statistic filter (DOSF) 27'. A tapped delay line of n-1 sample delays (D-flip-flops) clocked by a F1*n clock signal is coupled between the first input and the other n-1 inputs of the order determining circuit 27.1.

The segment averages from the divider 5' is applied to a first input of an n-input weighted average determining circuit 27.2 in the DOSF 27'. A tapped delay line of n-1 sample delays (D-flip-flops) clocked by a F1*n clock signal is coupled between the first input and the other n-1 inputs of the weighted average determining circuit 27.2. The weighted average determining circuit 27.2 is controlled by the order determining circuit 27.1 for determining weighting coefficients in accordance with equation 14, to obtain the reference segment average signal $F_A$ of equation 15.

A first input of a second weighted average determining circuit 29, also controlled by the order determining circuit 27.1, receives the output signal of the mixer 11. A tapped delay line of n-1 sample delays (D-flip-flops) clocked by a F1*n clock signal is coupled between the first input and the other n-1 inputs of the second weighted average determining circuit 29. The second weighted average determining circuit 29 obtains the filtered reference segment signal $F_{AF}$ of equation 16.

Like in the embodiment of FIG. 2, the mixer multiplication control signal k and 1-k are not modified in dependence upon the allowed correction interval I(t), i.e., the elements 20 and 22 of FIG. 1 are left out and, although not shown, the mixer multiplication control signal k and 1-k are obtained by the cascade connection of the blocks 5a, 6 and 7a of FIG. 1. In the present embodiment of the invention, the following adaptations are made to avoid that too much correction is applied to the video signal. The video signal F from the line delay 9 is directly applied to the adder 15. The average $F_A$ is subtracted from the filtered average $F_{AF}$ by a subtracter 7' whose output is applied to the adder 15 thru a limiter 24 whose function will be described below. Apart from the limiter 24, the combination of the signals F, $F_A$ and $F_{AF}$ effected by the subtracter 7' and the adder 15 in FIG. 3 fully corresponds to the combination of the signals F, $F_A$ and $F_{AF}$ effected by the subtracter 7 and the adder 15 in FIGS. 1 and 2. The average $F_A$ and the filtered average $F_{AF}$ are applied to a subtracting block 17 which operates in accordance with equation 17 to obtain the line correction signal LC. The line correction signal LC is applied to an averaging block 16 which operates in accordance with equation 16 to obtain the average correction signal AC. The average correction signal AC is applied to a calculating block 18 which operates in accordance with equation 18 to obtain the allowed correction interval I. The allowed interval I is applied to the limiter 24 which operates in accordance with the following equation:

$$\text{output of limiter } 24 = \lim[F_{AF}(S_i(y),t) - F_A(S_i(y),t); I(t)] \quad (21)$$

where the part before the semicolon in the lim-function is formed by the input of the limiter 24.

Figure 4:
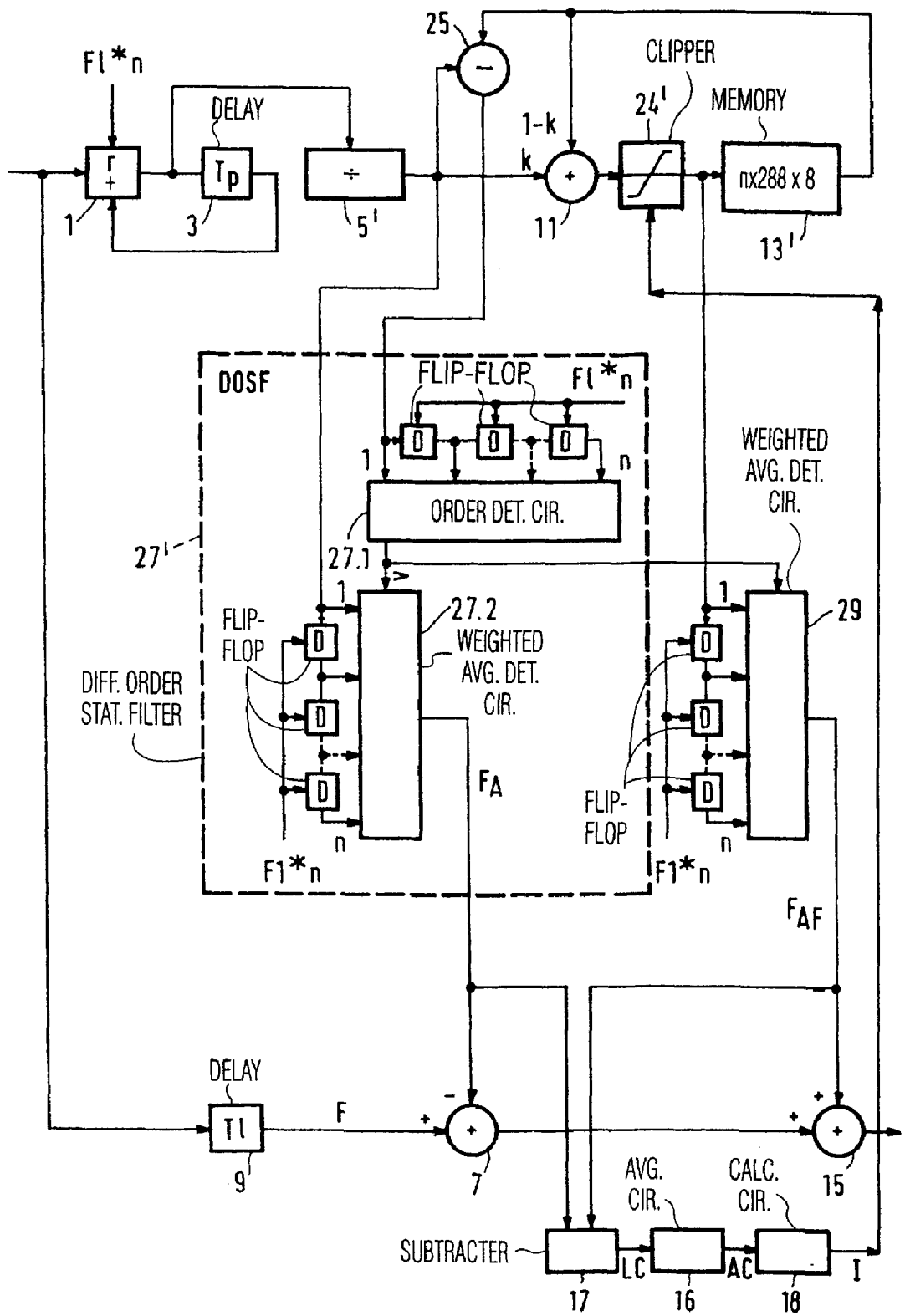
FIG. 4 presents a fourth application of the invention in an efficient n-segment implementation of a clamp noise reduction filter.

The embodiment shown in FIG. 4 corresponds to that shown in FIG. 3 as regards the clamp noise filtering part, but differs from the embodiment of FIG. 3 as regards the part which avoids that too much correction is applied to the video signal. First, the arrangement of the subtracter 7 and the adder 15 corresponds to that shown in FIGS. 1 and 2. Second, the output signal I of the block 18 is applied to a control input of a clipper 24' positioned between the output of the mixer 11 and the input of the memory 13'. The clipper 24 operates in accordance with the following formula:

$$\text{output of clipper } 24' = \lim[\text{output of mixer } 11; I(t)] \quad (22)$$

Figure 5:
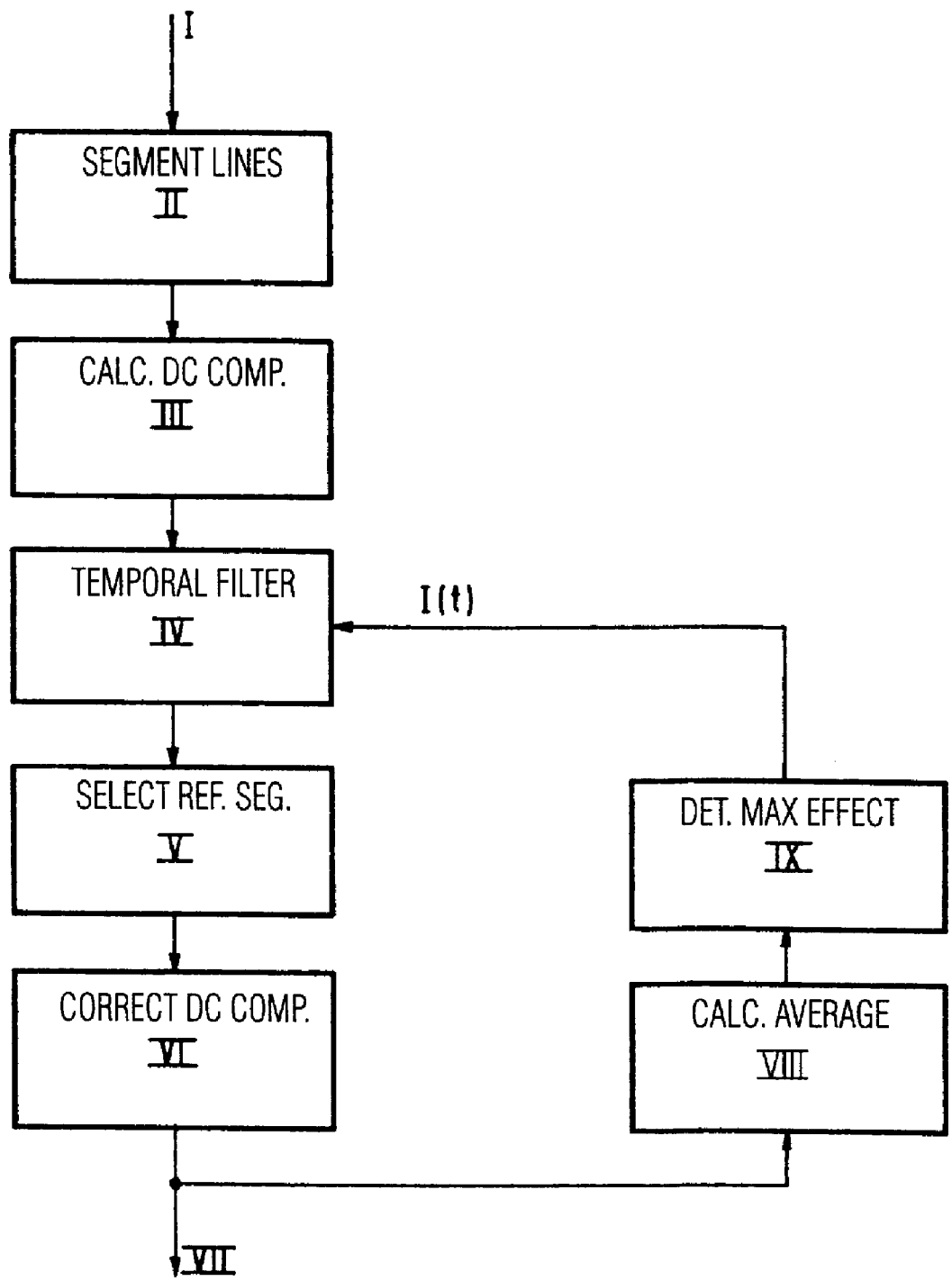
FIG. 5 shows a flowchart of an embodiment of the algorithm in accordance with the invention.

A preferred embodiment of the above-described first implementation of the invention can be summarized as follows, by means of the flowchart of FIG. 5. The symbol I indicates the input to the algorithm. The lines of a field are divided into segments in step II, which corresponds to the demultiplexer 21 of FIG. 2. The DC-component of each segment is calculated in step III, in accordance with equation 8 and corresponding to blocks 5.i in FIG. 2 and block 5' in FIGS. 3 and 4. The thus obtained DC-components are temporally filtered in step IV, in accordance with equation 9 and corresponding to blocks 11–13 and 24' in FIG. 4, under control of a clip level control signal I(t). Subsequently, in step V, in accordance with equation 12 and corresponding to block 27.1 in FIGS. 2–4, a reference segment is selected, i.e., a segment with most likely no motion. The DC-component of the whole line is then corrected by the difference between the filtered and the original DC-component of the reference segment in accordance with equation 15 and corresponding to the subtracter 7 and the adder 15, which step VI produces the filtered output lines of the algorithm as indicated by the symbol VII. The clip level control signal I(t), used to control the temporal filtering of the DC-components of each segment, is obtained by calculating the average correction over all lines in a field in step VIII in accordance with equation 16 and corresponding to block 16 in FIGS. 1–4, and, by determining, in step IX, the maximum allowed effect of the temporal filter in dependence upon the calculated average correction in accordance with equation 18 and corresponding to block 18 in FIGS. 1–4.

While in the above part of the description, the invention is applied to clamp noise filtering, the proposed technique of avoiding that too much correction is applied to a signal can also be applied to other processing operations. In general, the invention can be applied to any type of filtering, because each filtering results in some modification of the video signal in a given time interval, and this modification can be used to impose boundaries to an allowed modification in a subsequent time interval. For example, another implementation of the invention concerns spatial and/or temporal filtering of image data in the transform domain, in which one or more coefficients resulting from a (partial) block transform on image data are replaced by the output of a spatial and/or temporal filter having only this coefficient and corresponding coefficients in one or more neighboring fields at its input. The filter may be adaptive and/or recursive.

Spatial noise reduction filters for image data can be effective in removing noise in a fairly broad range of higher spatial frequencies, but will never be successful in removing very low frequent noise. Such noise, however, can be removed by means of a temporal filter. The required field memory is not necessarily expensive if only a few spatial frequency components have to be filtered. For example, it is possible to divide the image into blocks, and to calculate the average of all pixels in each block. These averages are then temporally filtered, and the pixel values of all pixels in a block are corrected with the difference between the filtered average and the original average of that block. The combination (cascade) of a spatial noise filter and a temporal filter on the DC coefficient of a block transform turns out to be very effective. A sophistication results if the correction is low-pass filtered before being applied to the signal. Also in such processing operations, the invention can advantageously be used to avoid that too much correction is applied.

The present implementation of the invention can also be used in a method of reducing interference artifacts in television pictures, which often introduce a single dominant sine-wave in a single direction which corresponds to a single peak in the two-dimensional frequency domain. By means of a partial block transform, it is possible to obtain the frequency coefficient(s) representing this interference, and to correct the signal with the difference between the inverse transform of the temporally filtered version of this or these coefficients and that of the original one. A reduction of the interference is thus obtained without using a full field memory.

Another application of the subject invention is in a method of reducing quantization effects introduced in the coefficient domain in a bit rate reducer using block transform coding. Thru adaptive temporal filtering, these quantization errors can be reduced before the inverse transformation to the sample domain. By limiting the filtering to the most visible or most degraded coefficients, it is possible to realize this temporal filtering with less than a pixel field memory. It then becomes also possible to further reduce the bit rate by applying a coarser quantization for a coefficient that, on average, requires a high bit rate, i.e., a coefficient that carries a large portion of the signal energy, when the resulting artifacts are reduced by means of a temporal filter which is only active for that coefficient. Again, the required field memory is reduced by a factor equal to the number of pixels in the block divided by the number of coefficients that have to be filtered.

It should be noted that the above-mentioned embodiments illustrate rather than limit the invention, and that those skilled in the art will be able to design many alternative embodiments without departing from the scope of the appended claims. For example, the invention can be used iteratively, whereby the same part of the video signal is repeatedly processed such that the filtering in a subsequent iteration depends on a statistical property, preferably the average or median, of the filtering in a previous iteration. In the claims, the notion "previous time interval" thus also encompasses a previous iteration. The invention can be implemented by means of hardware comprising several distinct elements, and by means of a suitably programmed computer. For example, the above description elucidates a clamp-noise reduction filter for image data signals in which the lines of the video signal are divided into a plurality of segments. In an alternative embodiment, the groups of pixels are formed by dividing the pixels in each line over a number of, e.g., 7, (equal) categories, such that the pixels in a category share a property, e.g., they lie in the same luminance interval.

The attention of the reader is drawn to the U.S. patent application Ser. No. 08/538,514, filed Oct. 3, 1995 (attorney's docket PHN 15,097 WO) which covers other aspects of the embodiments described in this application.

What is claimed is:

1. A method of processing a video signal, comprising the step of furnishing a filtered signal in response to the video signal, wherein the furnishing step includes adapting the filtering in dependence upon a statistical property of a modification effected by the filtering in a previous time interval of the video signal.

2. A method as claimed in claim 1, wherein the statistical property of the modification is an average modification in a previous field or frame of the video signal.

3. A method as claimed in claim 2, wherein said method further comprises the step calculating the average modification by determining line-modifications effected per line of the video signal, and by averaging the line-modifications over a field period of the video signal.

4. A method as claimed in claim 1, wherein the filtering is adapted by determining a maximum correction interval in dependence upon the statistical property of the modification.

5. A method of processing a video signal, comprising the step of furnishing a filtered signal in response to the video signal, wherein the furnishing step includes adapting the filtering in dependence upon a statistical property of a modification effected by the filtering in a previous time interval of the video signal, wherein the filtering is adapted by determining a maximum correction interval in dependence upon the statistical property of the modification, and wherein said furnishing step includes the steps of determining a signal component to be filtered, filtering said signal component to obtain a filtered signal component, determining a difference between said filtered signal component and said signal component, limiting said difference to a value within said maximum correction interval to obtain a limited difference, and adding said limited difference to said video signal.

6. A television receiver comprising an input for receiving a video signal, means for processing said video signal to furnish a processed video signal, and a display for displaying the processed video signal, the processing means comprising means for furnishing a filtered signal in response to the video signal, and means for adapting the filtering in dependence upon a statistical property of a modification effected by the filtering in a previous time interval of the video signal.

* * * * *